United States Patent Office 3,440,134
Patented Apr. 22, 1969

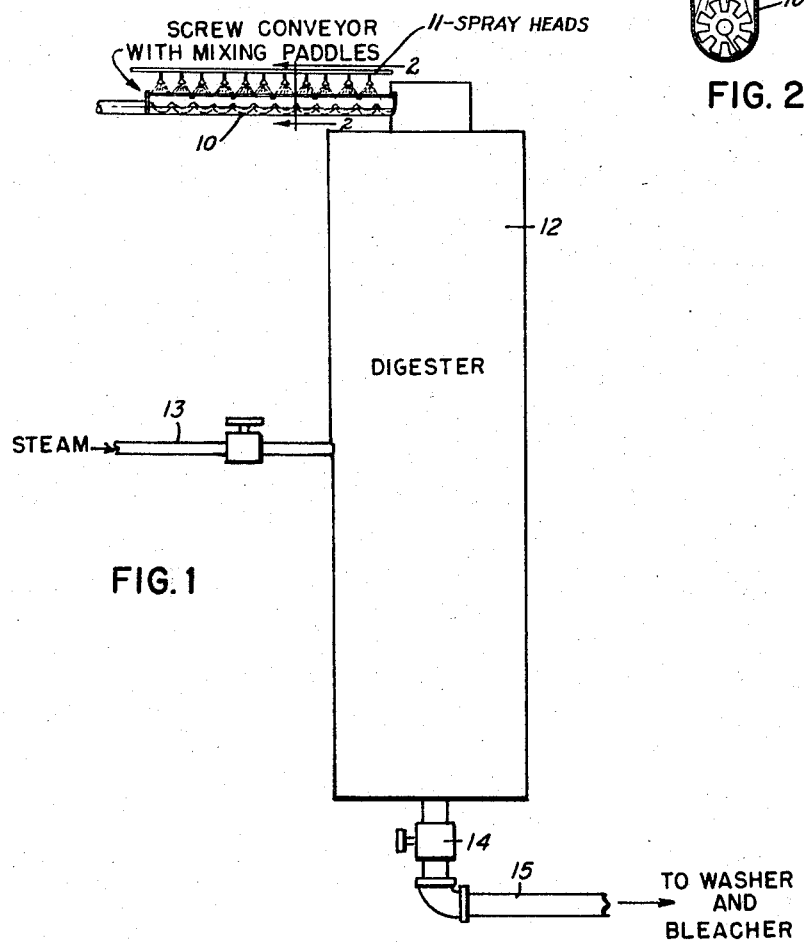

3,440,134
METHOD FOR TREATING CORRUGATED WASTE-PAPER AND PRODUCT PRODUCED THEREBY
Thomas L. Murphy, Jr., Columbia, Miss., assignor to M. T. Reed Construction Co., Jackson, Miss., a corporation of Mississippi
Filed Oct. 15, 1965, Ser. No. 496,573
Int. Cl. D21c 5/02
U.S. Cl. 162—8                                     4 Claims

ABSTRACT OF THE DISCLOSURE

A method of utilizing waste corrugated cardboard and paper in the production of acceptable stock for use in conventional paper making, and the paper stock produced by said method. Said method comprises the steps of comminuting waste corrugated cardboard and paper, forming a slurry of said waste, adjusting the solids content of said waste in slurry form to approximately 20%, digesting said comminuted waste slurry with caustic soda in an amount consisting of 10% by weight of the waste, heating said slurry with direct steam to approximately 160° C. for a period of approximately 3 hours, then pulping said digested slurry at a temperature of approximately 35° C. for between 3–5 minutes, increasing the solids content of the resulting pulp to approximately 30%, and bleaching said pulp as required to achieve a desired brightness thereof.

---

This invention relates to the utilization of waste corrugated cardboard and corrugated paper in the production of an acceptable grade of paper. More particularly, the present invention includes a unique digestion step for corrugated waste paper resulting in the production of a useful paper which may be bleached by conventional methods in order to produce an acceptable paper having a high brightness number.

Prior to this invention, utilization of corrugated waste paper materials has not been successfully achieved in the production of paper stock. On the contrary, corrugated waste cardboard and corrugated waste papers are utilized only in the further production of cardboard and the like. The lack of usage of corrugated waste paper in the production of suitable paper having a sufficient degree of brightness is hindered due to the source for the production of corrugated papers. In the context herein corrugated paper includes the concept of corrugated cardboard. Corrugated papers now primarily in use are made principally from straw and wood chips which in the cooking and pulping process utilized results in a stock heavily laden with chemicals deleterious in the manufacture of a suitable paper unless such chemicals have been eliminated by the method of digestion with which the present invention is particularly concerned. Usually, such materials are produced as a result of a so-called "semichemical" process.

Accordingly, it is a primary object of the present invention to provide a method for digesting corrugated waste paper in order to arrive at a pulp stock utilizable as means for producing acceptable paper.

It is another object of the present invention to provide a paper pulp stock fabricated from corrugated waste paper.

Additional objects and advantages will become apparent from a detailed consideration of the present invention as set forth below, taken with the accompanying drawing, in which FIG. 1 is a side elevation of the digestor and appurtenances employed in the method of the invention, and FIG. 2 is a section taken along line 2—2 of FIG. 1.

In accordance with the concepts of the present invention, corrugated waste paper is comminuted with a quantity of water to form a slurry of 20% solids content of fairly large pieces of approximately three-inch squares. The thus formed slurry is conveyed by suitable means such as a horizontal screw conveyor or a conveyor having mixing paddles to accomplish a thorough agitation. While the comminuted slurry is propelled, it is sprayed with a 50% solution of caustic material such as sodium hydroxide or calcium hydroxide. The quantity of solution is such that approximately 10% caustic is introduced based upon the dry weight basis of the corrugated waste paper.

The caustic treated slurry is charged into a conventional digestor. Steam under high pressure is introduced directly into the digestor in order to cook the slurry by increasing the temperature to approximately 160° C. The temperature is held at that level for a period of three hours. Thereafter, by means of a conventional blow valve, the resulting brown slurry after digestion is flowed into a conventional pulper in which it is pulped in a suitable manner at a temperature of 35° C. for a period of 5 minutes in which time the digested corrugated materials are easily defibered. At this point the pulp has a consistency of approximately 3–4% solids content. This solids content is increased by centrifuging to approximately 30% solids. As a result of following the principles of the present invention, a high yield is obtainable of between 85–90% based upon the waste materials. The potassium permanganate number is quite low as would be expected, being of the order of 14/25 ml. Once the potassium permanganate number has been determined the pulp slurry is bleached by conventional three-stage method of chlorine, caustic extraction and hypochlorite.

The permanganate number is a method of expressing the bleachability of pulp. This test is set forth at page 463 et seq., Pulp and Paper Chemistry and Chemical Technology, 2nd ed., vol. 1, by James P. Casey.

In general, the more stages used in bleaching, the lower the bleach consumption, but the greater the cost of handling. The three stage bleaching process includes direct chlorination, wherein between 40 and 70% of the total bleach is added as direct chlorine. This is mixed with the pulp at a consistency of about 3 to 4% at a pH of 1.0 to 2.0. It is desirable to add as much chlorine as possible in the chlorination stage and a minimum of chlorine in the hypochlorite stage, since this preserves the strength of the fiber. The chlorination stage is followed with a water and alkali extraction step to remove solubilized lignin residues so that they will not consume unnecessary bleach or alkali in the subsequent stages. Finally, the function of hypochlorite in multistage bleaching is to remove by oxidation the colored residues remaining in the pulp after chlorination and alkali extraction. Chlorinated and extracted pulp still has a dark color because it contains appreciable quantities of residual chlorinated lignin and other colored substances. These substances are readily oxidized by hypochlorite, and consequently the final stage in multistage bleaching is usually a hypochlorite bleach. The degree of previous chlorination and caustic extraction govern the amount of hypochlorite required in the final stage.

In order to more fully understand the present invention, the following example is set forth with reference to the accompanying drawing.

100 lbs. of corrugated waste paper, after having been suitably hand sorted, for instance, is charged into a conventional paper shredder where it is chopped into approximately three inch squares. From there the shredded material is conveyed to a conventional macerator into which 500 lbs. of water is added while the comminution is being undertaken. The comminuted material in slurry form is transferred through a conventional screw conveyor operating in a trough as shown diagrammatically at 10, there being plurality of spray heads 11 disposed above same for the introduction of a 50% solution of sodium hydroxide so that the caustic is mixed as the slurry is propelled towards a digestor 12. Sufficient caustic is sprayed over the slurry so that the total quantity of caustic results in a level of approximately 10% by weight of the waste material on a dry basis, namely, approximately 10 lbs. of sodium hydroxide to the 100 lbs. of waste starting material. The digestor 12 is of a suitable size to accommodate the mixture, inasmuch as the operation of the present invention is carried out in a batch manner in this specific example but need not be provided suitable equipment is utilized for continuous operation. Steam is introduced through a suitable conduit 13 which opens directly into near the central portion of the digestor 12. In order to provide for suitable mixing, conventional agitation means is provided in the digestor; or the digestor may be of the tilting variety. The steam is introduced under high pressure so that the contents in the digestor are increased to 160° C. and are held at this level for approximately three hours. Approximately 8.75% caustic was consumed during this three-hour digestion step. At the end of the digestion period a blow valve 14 is opened so that the contents in the digestor are discharged through conduit 15 for further treatment. This further treatment takes he form of convenional pulping with the introduction of additional water so that the resultant slurry has a solids content of 3 to 4% achieved for the most part by the condensation of the steam during the three-hour digestion step.

Due to the vigorousness of the caustic digestion period it is found that the pulping time which is carried out at 35° C. is as little as five minutes in which to achieve defibration of the solids material in the slurry.

Thereafter, the pulp is centrifuged to remove water to thicken the slurry to 30% solids content. The yield of the resulting pulp is approximately 86% based upon the waste materials introduced. The potassium permanganate number is 14.2/25 ml.

Based upon the potassium permanganate number the pulp is bleached in a conventional three-stage method of chlorine concentration extraction and hypochlorite to achieve a brightness of approximately 80 points.

A paper made by conventional methods from the pulp of the present invention is an acceptable material for many purposes, so that the corrugated waste paper and cardboard may be utilized for other purposes than reproduction as corrugated material.

While in the above example the temperature of digestion is stated to be approximately 160° C., it is possible to achieve excellent results by employing somewhat lower temperatures and a longer digestion period. Conversely, it is possible to increase the temperature of digestion with a concomitant shortening of the digesion period.

It will be seen that the objects of the present invention have been achieved by the aforementioned description of vigorously digesting comminuted corrugated waste paper and corrugated waste cardboard for an extended period of time at high temperature conditions leading to a pulp utilizable in the production of conventional paper.

What is claimed is:

1. A method of preparing a paper stock comprising comminuting waste corrugated paper, forming a slurry of said waste, adjusting the solids content of said waste in slurry form to approximately 20%, digesting said comminuted waste slurry with caustic soda in an amount consisting of 10% by weight of the waste, heating said slurry with direct steam to approximately 160° C. for a period of approximately 3 hours, then pulping said digested slurry at a temperature of approximately 35° C. for between 3–5 minutes, and increasing the solids content of the resulting pulp to approximately 30%.

2. A method of preparing a paper stock comprising comminuating waste corrugated paper, forming a slurry of said waste, adjusting the solids content of said waste in slurry form to approximately 20%, digesting said comminuted waste slurry with caustic soda in an amount consisting of 10% by weight of the waste, heating said slurry with direct steam to approximately 160° C. for a period of approximately 3 hours, then pulping said digested slurry at a temperature of approximately 35° C. for between 3–5 minutes, increasing the solids content of the resulting pulp to approximately 30%, and thereafter bleaching said pulp.

3. The paper stock produced by the method of claim 1.

4. The paper stock produced by the method of claim 2.

References Cited

UNITED STATES PATENTS 2,072,487   3/1937   Snyder _____ 162—8

HOWARD R. CAINE, *Primary Examiner.*